D. F. McCARTHY.
SHOCK ABSORBER.
APPLICATION FILED JAN. 20, 1912.

1,063,459.

Patented June 3, 1913.

2 SHEETS—SHEET 1.

WITNESSES

INVENTOR
Daniel F. McCarthy
By Franklin N. Hoy
Attorney

D. F. McCARTHY.
SHOCK ABSORBER.
APPLICATION FILED JAN. 20, 1912.

1,063,459.

Patented June 3, 1913.

2 SHEETS—SHEET 2.

WITNESSES
Fenton S Belt
A. L. Koogh

INVENTOR
Daniel F. McCarthy
By Franklin H. Hough
Attorney

UNITED STATES PATENT OFFICE.

DANIEL F. McCARTHY, OF MOLINE, ILLINOIS.

SHOCK-ABSORBER.

1,063,459. Specification of Letters Patent. Patented June 3, 1913.

Application filed January 20, 1912. Serial No. 672,471.

*To all whom it may concern:*

Be it known that I, DANIEL F. MCCARTHY, a citizen of the United States, residing at Moline, in the county of Rock Island and State of Illinois, have invented certain new and useful Improvements in Shock-Absorbers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in shock absorbers adapted for use in connection with automobiles and other vehicles and designed to absorb the sudden shock and strain coming upon a spring when going over obstructions or ruts, etc.

It is a well known fact that springs upon vehicles are usually broken, not upon the downward pressure incident to striking an obstruction, but rather upon the rebound of the spring with its superimposed weight thereon.

The purpose of my invention is to prevent this sudden rebound of the spring by the provision of a device having various details of construction and combinations and arrangements of parts, which will be hereinafter fully described, shown in the accompanying drawings and then specifically defined in the appended claims.

I illustrate my invention in the accompanying drawings, in which:—

Figure 1:
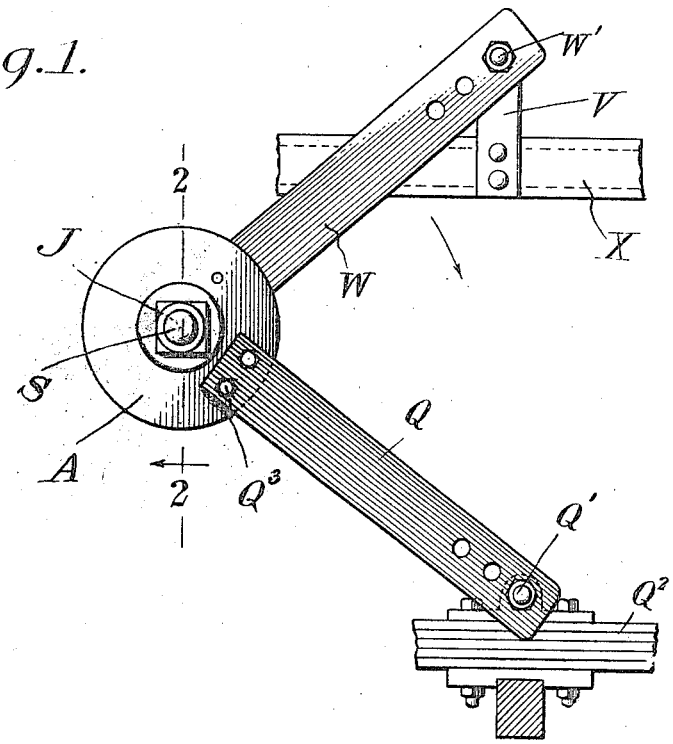
Figure 2:
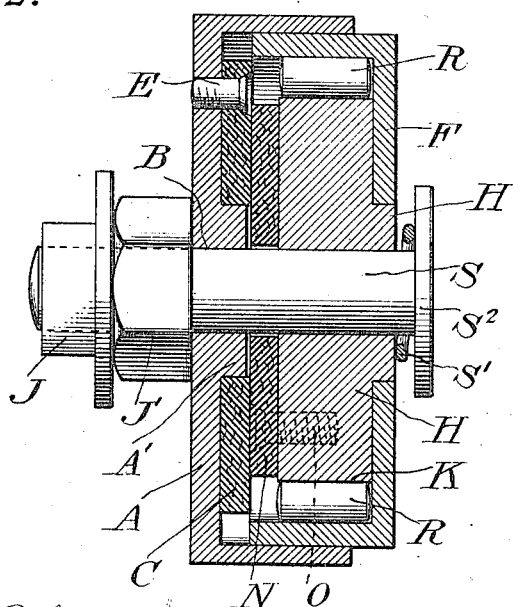
Figure 3:
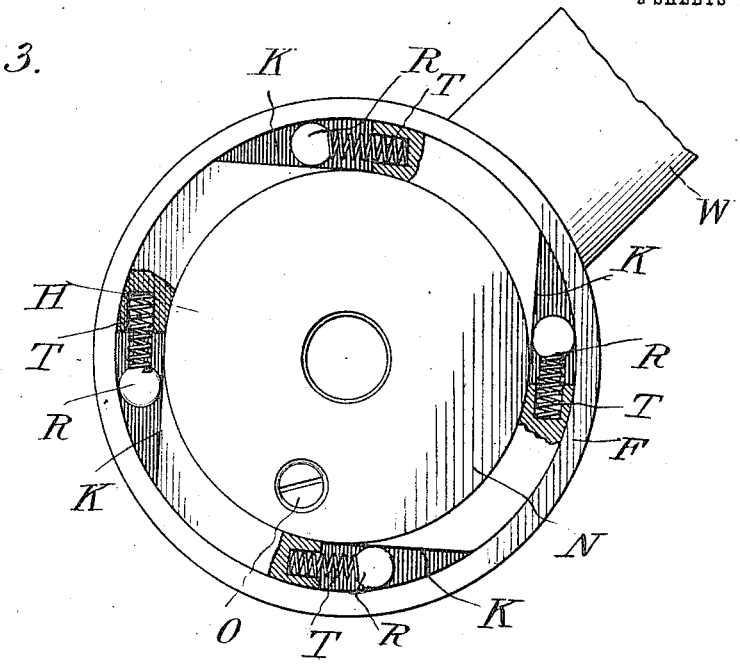
Figure 4:
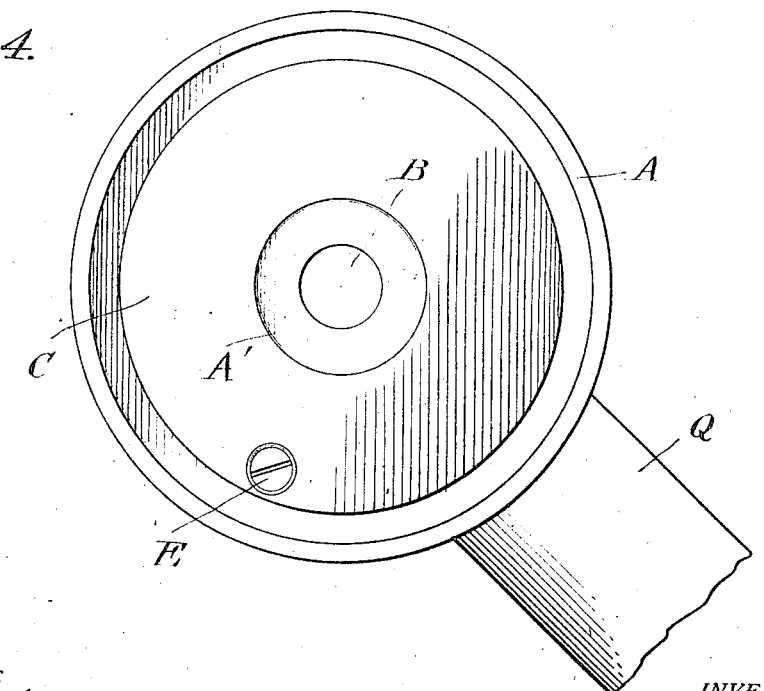

Figure 1 is a side elevation of my improved shock absorber showing the manner of attaching the same to the spring and box or frame of a wagon. Fig. 2 is a sectional view on line 2—2 of Fig. 1 looking in the direction of the arrow. Fig. 3 is an enlarged detail plan view of one of the clutch sections of the shock absorber, and Fig. 4 is a similar view of the other section of the absorber.

Reference now being had to the details of the drawings by letter, A designates a flanged shell provided with a central aperture B, and a boss A' rises about said central aperture. C is a friction disk having a central aperture to receive said boss, shown clearly in Fig. 2 of the drawings, the outer face of the disk extended preferably beyond the face of the boss and held in place by means of a screw E. A second circular-outlined flanged shell F of smaller diameter than the disk C telescopes within the latter and is provided with an opening adapted to receive the clutch plate H, having a boss H' extending through an aperture in said flanged shell F. The clutch plate H has a friction disk, preferably of leather or any other fiber and designated by letter N, which is held to the plate by means of a screw O. Said plate H has a series of recesses K formed in the periphery thereof, as shown clearly in Fig. 3 of the drawings, and R, R designate cylindrical shaped rollers, mounted one in each of said recesses and held in their normal positions by means of coiled springs T.

A bolt, designated by letter S, passes through registering apertures in the clutch plate H and the shell A and a coiled spring S' is interposed between the head S² of said bolt and the end of the boss H', and nuts J and J' are fitted to the threaded ends of the bolt and adapted to hold the parts in the positions shown in Fig. 2, in which the adjacent faces of the friction disk are in contact with each other.

A bar, designated by letter Q, is adjustably and pivotally connected by means of a bolt Q' with the spring Q² and its other end fixed by means of bolts Q³ to the shell A, as shown clearly in Fig. 1 of the drawings. A second bar, designated by letter W, is bolted to the shell F and adjustably connected by means of a pivotal bolt W' with an upright bar V fastened to the frame X of the vehicle.

The operation of my invention will be readily understood and is as follows:— When the parts are connected in the manner shown in Fig. 1 of the drawings and in the event of the vehicle to which the parts are fastened coming into a depression or over an obstruction, causing the weight upon the vehicle to be thrown heavily upon the springs, the bar W will be thrown down in the direction of the arrow in Fig. 1, the rollers in the clutch plate turning idly but, the moment the rebound commences, a reverse motion will be imparted to the shells through the medium of the connections shown and cause the rollers to impinge or have a wedging action intermediate the long walls of the recess and the concaved wall of the flange of the shell F, thus checking the rebound and thereby preventing injury to the spring. After the rebound has been checked, the coiled springs will tend to return the rollers to their normal positions under the tension of the springs and the other parts to their normal positions.

What I claim to be new is:—

A shock absorber comprising two centrally apertured, circumferentially flanged shells adapted to telescope within each other, the inner face of one of said shells having a boss about the aperture therein, a friction disk having a central aperture surrounding said boss and fastened to the shell having said boss, said disk being of smaller diameter than the shell to which it is fastened, leaving an annular space about the disk for the reception of the flange of the other shell, a cylindrical, centrally apertured clutch plate having a boss upon the outer face thereof engaging an opening in the inner telescoping shell and provided with a series of angular outlined recesses in its circumference, friction rollers seated in said recesses, a friction disk fastened to the inner face of said clutch plate and having its circumference inside the inner marginal edges of said recesses, a headed bolt having a bearing in central apertures in said plate and outer telescoping shell, a nut upon said bolt, and a spring interposed between the boss upon said clutch plate and the head of the bolt, as set forth.

In testimony whereof I hereunto affix my signature in the presence of two witnesses.

DANIEL F. McCARTHY.

Witnesses:
M. J. CAIRNS,
FRANK A. CROSS.

---

Copies of this patent may be obtained for five cents each, by addressing the "Commissioner of Patents, Washington, D. C."